(12) United States Patent
Dorenbosch et al.

(10) Patent No.: US 8,942,109 B2
(45) Date of Patent: Jan. 27, 2015

(54) IMPAIRMENT SIMULATION FOR NETWORK COMMUNICATION TO ENABLE VOICE QUALITY DEGRADATION ESTIMATION

(75) Inventors: Jheroen Pieter Dorenbosch, Paradise, TX (US); Zachry Shay Collins, Plano, TX (US)

(73) Assignee: Anritsu Company, Morgan Hill, CA (US)

( * ) Notice: Subject to any disclaimer, the term of this patent is extended or adjusted under 35 U.S.C. 154(b) by 81 days.

(21) Appl. No.: 13/455,838

(22) Filed: Apr. 25, 2012

(65) Prior Publication Data

US 2013/0286860 A1    Oct. 31, 2013

(51) Int. Cl.
*H04L 12/26* (2006.01)

(52) U.S. Cl.
USPC ........... 370/244; 370/242; 370/250; 375/224; 714/715

(58) Field of Classification Search
None
See application file for complete search history.

(56) References Cited

U.S. PATENT DOCUMENTS

| | | |
|---|---|---|
| 5,351,201 A | 9/1994 | Harshbarger, Jr. et al. |
| 7,693,266 B1 | 4/2010 | Ray |
| 8,457,112 B2 * | 6/2013 | Krishnamurthy et al. .... 370/352 |
| 2002/0137506 A1 | 9/2002 | Matsuoka |
| 2006/0029067 A1 | 2/2006 | Conway |
| 2006/0281452 A1 | 12/2006 | Anderton |
| 2007/0149186 A1 * | 6/2007 | Barbosa da Torre et al. . 455/423 |
| 2009/0307531 A1 | 12/2009 | Karthikeyan et al. |
| 2010/0099361 A1 * | 4/2010 | Lundstrom et al. ........ 455/67.11 |

OTHER PUBLICATIONS

International Searching Authority, International Search Report and Written Opinion for PCT International Application No. PCT/US2013/038273, Jul. 16, 2013, 11 pages.

* cited by examiner

*Primary Examiner* — Donald Mills
(74) *Attorney, Agent, or Firm* — Meyer IP Law Group

(57) ABSTRACT

An automated method for testing audio signal quality of cell phone transmissions provides a Mean Opinion Score (MOS) output using inexpensive test components. The test system uses a server computer to eliminate the need for expensive faders used in a bench test system. The server computer manipulates data packets from the reference media file to simulate impairments, including losses, errors, noise and jitter, at a much lower cost than using actual faders. Transmission through two separate radio access networks RANs is provided to simulate two parties communicating using separate mobile devices (an end-to-end test solution) with a single cell phone.

27 Claims, 11 Drawing Sheets

IMPAIRMENT SIMULATION FOR NETWORK COMMUNICATION TO ENABLE VOICE QUALITY DEGRADATION ESTIMATION

BACKGROUND

1. Technical Field

The present invention relates to a test system for simulating impairments, including losses, errors, noise and jitter, in a network wireless communication signal to enable estimation of the resulting degradation in voice or video quality.

2. Related Art

Operators need to ensure that their systems provide excellent multimedia quality. Every time a new handset is introduced, it should be tested to make sure it produces clear audio and video under ideal and under degraded coverage conditions.

FIG. 1 illustrates the classic test system to measure media quality in a wireless system. Typically the media quality is measured or estimated for voice media or for video media. As shown, the system includes two User Equipment (UE) devices 2 and 4 which enable telephony type voice communications over a wireless link. The devices 2 and 4 can be cellular mobile phones. The UE 2 is used by a speaker to provide a voice reference media 1 that is converted by the UE 2 to a packet data signal and transmitted over a wireless air interface link 6 to a wireless system 8. The wireless air interface link 6 is part of a first Radio Access Network (RAN) and can carry mobile phone signals such as LTE, UMTS, CDMA or GSM signals. The wireless system 8 can include a base station for mobile phone communications. The wireless system 8 then communicates the packet data signal again through another wireless interface link 10 of a second RAN to another UE 4. The UE 4 is also the Device Under Test (DUT) as it converts the packet data signal back to an audio signal that is provided through a speaker of the DUT UE 4 for listeners to hear. The audio signal played through the speaker provides a degraded media signal 11 to listeners. The listeners then determine the quality of the degraded media signal.

Voice quality of a connection can be measured and reported in many ways. Historically the preferred method was to let a panel of listeners, as illustrated in FIG. 1, evaluate the perceived received quality of the audio received from one or more speakers. The resulting scores were averaged and captured as a Mean Opinion Score (MOS). The MOS scale ranges from 1 (bad) to 5 (excellent). The score for a wireless connection depends on the codec, or signal encoding and decoding method that is used. The score also strongly depends on the latency and reliability of the air interfaces 6 and 10. For instance GSM has a value of 3.5 and AMR-WB has a value of 4.2.

Evaluating a MOS with real listeners is subjective and a large number of listeners must be used. Gathering people to listen is time consuming and costly. In recent years more objective methods have been developed to measure the MOS. For these methods one injects reference audio from a source file (the 'reference file') recorded from a speaker and then captures the resulting audio after transmission through at least one RAN in a target file (the 'degraded' file.) One can then use software to compare and analyze the reference file and the degraded file to estimate the MOS.

Several software packages are commercially available for automated assessment of speech quality and to provide a perceptual objective listening quality assessment. Example software packages are PESQ and POLQA. PESQ stands for "Perceptual Evaluation of Speech Quality." It is standardized as ITU-T recommendation P.862. POLQA stands for "Perceptual Objective Listening Quality Assessment" and provides automated assessment of speech quality. It is standardized as ITU-T recommendation P.863.

Voice quality strongly depends on the properties of the Radio Access Networks (RANs) that are being used by the source UE and the target UE. The components making up a RAN (e.g. the source UE and base station) and the air interface that connects them (e.g. the LTE air interface) introduces impairments such as packet losses, packet delays, fluctuations in the packet losses (jitter) and packet errors (frame errors). The RAN may be a RAN of a wide area wireless network that uses GSM, UMTS, GPRS, CDMA or LTE and the like, or the RAN of a local area wireless network such as DECT, Bluetooth, and Wi-Fi and the like. Another contribution comes from the internal components of the network that interconnects the source RAN and the target RAN, as internal components in the wireless system 8 in FIG. 1. For simplicity these internal components are not shown but may include well-known entities such as one or more base stations (such as LTE Node-Bs), mobile switching centers, regional network controllers, serving and packet gateways, gateway controllers, mobility management entities, the various Call Session Control Functions (CSCFs) of an IP multimedia system such as the Proxy-CSCF, the Interrogating CSCF, and the Serving CSCF and various databases. The wireless system 8 may further contain entities that manage the quality of service, such as a policy charging and rules function.

FIG. 2 shows components used in conventional test systems that emulate the effect of impairments to enable evaluation of one or more RANs in a laboratory environment. The emulation test components of FIG. 2 are provided in the test system 20 which receives signals from UEs in a system otherwise similar to FIG. 1. The signals transmitted to and from the test system 20 include a reference media signal 1 from the UE 2 and the output includes a degraded media signal 11 provided from a DUT UE 4. Components carried forward from FIG. 1, as well as components carried forward in subsequent drawings, are similarly labeled.

The test system 20 includes faders 22 and 28 and components 24 and 26 that emulate two separate RANs 24 and 26. A fader is a device that emulates the behaviors of an air interface, for example by varying the signal strength of the modulation of the uplink and/or downlink air interface connections. The test system 20 provides a way to produce artificial impairments of a source RAN and a target RAN by emulating each RAN with a signaling tester (like an Anritsu MD8430), and by imposing artificial impairments on each air interface with a fader (like an Anritsu MF6900A.)

To estimate a MOS using the test system 20 of FIG. 2, one configures the testers and the faders 22 and 28 according to specific RAN parameters. This causes precisely controlled losses, delays, jitter and frame errors on the air interfaces. Next a call is started between the source UE 2 and the target UE 4 and a user plays the sound from a reference media file 1 into the source UE 2, for example via the source UE 2 built-in microphone or via the source UE 2 microphone jack. The sound is then captured at the target UE 4 from its built-in speaker or headset jack, and converted to digital data and stored as a degraded media file 11. PESQ or POLQA is finally used to compare and analyze the files and to obtain the MOS. Note that the same system in a slightly different configuration may be used to obtain a MOS for multimedia transmission from the DUT UE 4 to the peer UE 2.

Operators need to measure the impact on the MOS of the various parameters that control the air interface so that they can optimize throughput without degrading voice quality.

What is needed is a method that can automatically evaluate the MOS for a UE for a voice call that involves a source RAN and a target RAN under various RAN conditions without the cost of expensive equipment such as the faders in shown in FIG. 2.

SUMMARY

Embodiments of the invention provide an automated method to estimate a Mean Opinion Score (MOS) for a Device Under Test (DUT) using inexpensive test components. The test system uses a server computer to eliminate the need for faders and other test equipment conventionally used. The server computer manipulates data packets from the reference media file to simulate noise and jitter at a much lower cost than using actual faders. The server computer also uses software to provide a solution for automated assessment of the speech quality as experienced by a user of a wireless telephony system. The server computer provides the automated assessment with software that performs a perceptual objective listening quality assessment by a standardized methodology such as PESQ or POLQA or similar procedure known in the art. The system may assess the media quality for media transmitted over the air interface in the downlink direction (towards the DUT) and/or transmitted in the uplink direction (from the DUT).

The test system server can estimate media quality for voice and for video media. The computer creates a simulated reference speech or video sample that is extracted as a reference media file and converted into a Voice over IP (VoIP) packet stream. Artificial impairments are imposed by the server computer on individual packets in the stream of packets to simulate the impairments that are typical during transmission over one or more wireless Radio Access Network(s) (RANs). The impairments introduced simulate impairments created by the air interfaces 6, 10 or radio frequency (RF) links as well as a wireless connection system 8 that can cause the order of packets received to be delayed or changed so that the order of packets must be changed back upon reception by a target peer media device DUT to maintain the correlation between consecutive packets and prevent voice signal disruption. The impairments introduced can also simulate a dropping of a first individual packet that causes a delay in transmission of a second individual packet, a condition that causes packets to bunch up which will affect voice quality. The system can introduce the impairments using a simulated source peer media device for the UE 2, enabling simulation of transmission through two separate RANs by two parties communicating using separate mobile devices (an end-to-end test solution) with a single cell phone.

In the test system, an operator can vary the parameters for the impairments in the first and second RANs and investigate its effect on the DUT and the media quality. This allows for rapid characterization of the DUT, or, conversely, an efficient way to optimize the configuration of the RANs.

The server computer transmits the stream of packets with these impairments over a wireless connection to and from the DUT. In the downlink test direction the audio signal that represents the stream of packets is received back from the DUT and is captured back into the server computer, e.g. by using a sound card, and converted into digital audio to form a degraded media file. The degraded media file and the reference media file are then compared and analyzed to obtain the MOS in the server computer.

In some embodiments the test system can be run in the uplink direction. In this direction, the server computer transmits a reference audio signal to the DUT UE 4 through an internal or external sound card using a speaker to transmit to the DUT microphone or a cable from the sound card to the DUT earphone connection. The DUT then converts the audio signal into a stream of packets, which are transmitted over the air interface in the uplink direction through a test system back to the server computer, which captures the stream of packets into a degraded media file for evaluation.

In another embodiment the test system can provide and analyze video signals. The video signals can be projected from the server computer and received by a video camera of the DUT. The DUT can then packetize the video signals and transmit them as a stream of packets through a test system back to the server computer, which captures the stream of packets as a degraded media signal for evaluation. In yet another embodiment both the audio and video signals can be transmitted and evaluated.

The test solution of embodiments of the present invention can, thus, provide the following features: (1) an independent simulation of a source RAN, target RAN and the network that connects the RANs; (2) a solution that manipulates data packets to simulate losses, errors, noise and jitter by introducing impairments while controlling a correlation between the impairments imposed on consecutive packets; and (3) a solution that enables simultaneous estimation of an end-to-end MOS and the contribution to the total MOS from a single DUT.

BRIEF DESCRIPTION OF THE DRAWINGS

Further details of the present invention are explained with the help of the attached drawings in which.

DETAILED DESCRIPTION

Figure 3:
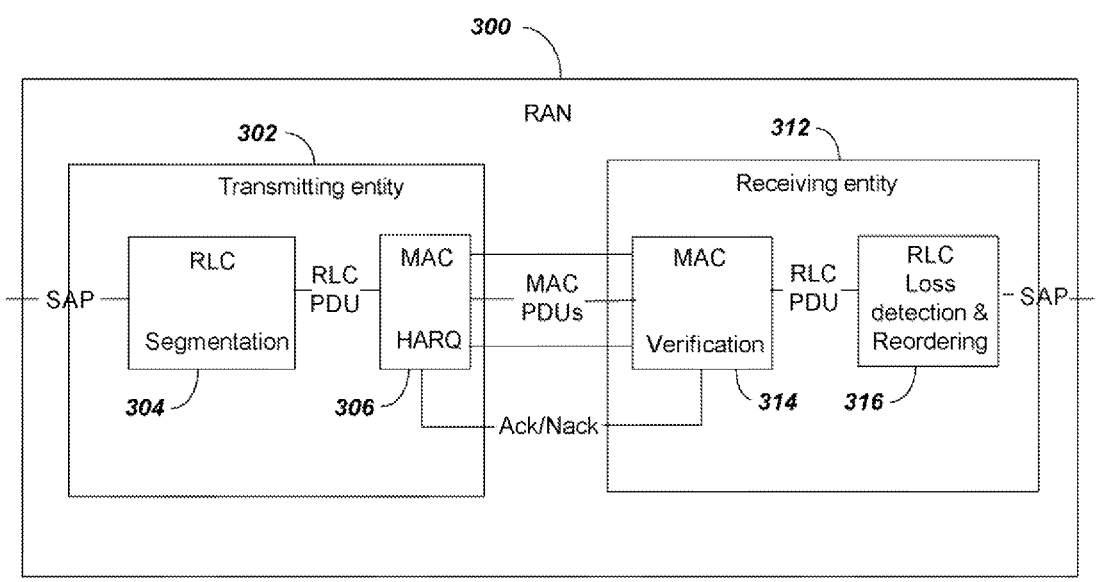
FIG. 3 shows components of a RAN that can be simulated to include embodiments of the present invention.

FIG. 3 shows components of a RAN 300 to illustrate signals that are transmitted and received over a typical LTE network. The system of FIG. 3 will enable a subsequent explanation of how a server computer in the test system according to the present invention can manipulate the signals to simulate noise and jitter. FIG. 3 illustrates the operation of various protocol layers that impact voice quality in an LTE RAN. For simplicity it only shows the Radio Link Control (RLC) layer and the Media Access Control (MAC) protocol layers.

For a source RAN, the transmitting entity is the source UE and the receiving entity is the base station. In the target system those roles are reversed. Only operation in Unacknowledged RLC Mode (UM) will be discussed, since that mode is typically used for voice and video. Details of the MAC and RLC operation can be found in 3GPP Technical Specification (TS) 36.321 and TS 36.322 respectively.

The transmitting entity 302 receives data at a Server Access Point (SAP) in the RLC layer. The source UE sends the SAP signals that are received as a stream of media frames which are encapsulated in RTP IP packets. This is commonly referred to as Voice over IP (VoIP). The voiced packets originate at the source UE at regular intervals (20 ms for the AMR-WB encoded voice). The time stamp in the RTP packets represent the time of the encoding. The RLC Segmentation layer 304 performs segmentations and assigns sequence numbers. For voice there typically will be one RTP packet per segment. The RLC Segmentation layer passes the packets to the transmitting MAC entity 306 which transmits the packets over the air interface to the MAC verification entity 314 of the receiving entity 312. The MAC layer 306, 314 uses Hybrid ARQ and returns an Ack or Nack to indicate whether the transmission succeeded. A Nack causes the transmitting MAC entity 306 to retransmit the packet. A packet can be lost if the maximum number of retransmissions is reached or when a Nack indication is corrupted and interpreted as an Ack.

Since the effective number of retransmissions is different for different packets, they may be received by the MAC verification entity 314 in the wrong order. The RLC receiver entity 316 will re-order such packets by waiting for packets that come late. The maximum waiting time is controlled by a T_reorder timer in the software of the RLC receiver 316, so that the RLC 316 will not wait forever when a packet is lost. Once packets are received and ordered, the RLC 316 will then transmit them out through a SAP. Operation in the target RAN is similar to the receiver RAN 300, except that the packets may not arrive at a regular clip.

Figure 4:
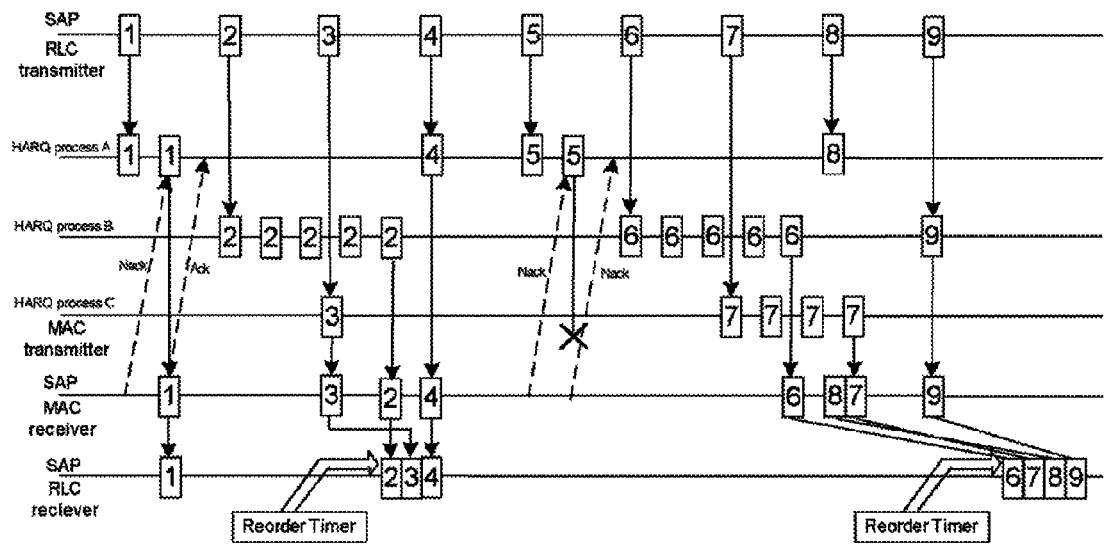
FIG. 4 shows the arrival of packets, the assignment of sequence numbers (1, 2, 3 . . . ), and the distribution of the packets within the RAN of FIG. 3.

FIG. 4 shows the arrival of packets at the SAP input to RLC 304 in transmitting entity 302 with an assignment of sequence numbers (1, 2, 3 ... 9) in the first line, and the distribution of the packets within the RAN 300 of FIG. 3. The next three lines show the Hybrid Automatic Repeat Request (HARQ) processing in the MAC 306 of the transmitter 302 which handle separate HARQ processes A-C to feed packets to the MAC 314 of receiver 312. The first transmission of packet #1 does not succeed and the MAC receiver 314 returns a Nack. The second transmission, or retransmission succeeds, and is indicated by an Ack. Packet #2 takes more retransmissions, but eventually arrives after four retransmissions, which each taking 8 ms. Transmission of packet #3 succeeds the first time, so that the RLC receiver gets packet #3 before it has packet #2. In that case RLC 316 starts the reorder timer. It will not release packet #3 before it gets packet 2, and it will release the packets in the right order.

FIG. 4 also illustrates what happens when a packet, such as packet #5, is lost. When packet #5 is first not received, the RLC 316 starts the reorder timer when it gets packet #6 and starts to wait for packet #5 until the timer runs out. Packet #6 is shown to arrive late because it took too many retransmissions. This is not unreasonable, given the bad channel conditions that caused the previous packet #5 to be lost. Such bad channel conditions cause correlation between the losses and delays of consecutive packets. Note that by the time the reorder timer of RLC 316 runs out, several more packets #8, #7, #9 have arrived. The RLC 316 will then release the arrived packets in the right order over the SAP.

It is important to realize that losses and delays in the RAN are highly correlated. A loss or a delay of one packet may cause the delay of several other packets. These correlations can seriously impact voice quality and should be properly considered when evaluating a MOS.

Note that although losses of a RAN are dealt with in FIG. 3, the network that connects the source RAN and target RAN will also introduce additional losses, delays and jitter. It may also add frame errors. When the source UE and the target UE use different codecs, the network will contain transcoders which introduce additional impairments. The impairments of the network connecting two RANs may, thus, also need to be simulated.

RAN Impairment Simulation

Figure 1:
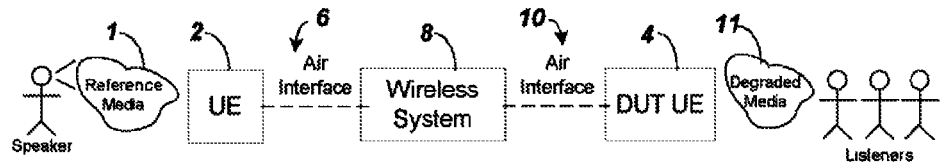
FIG. 1 illustrates the classic test system to measure voice quality in a wireless system.
Figure 2:
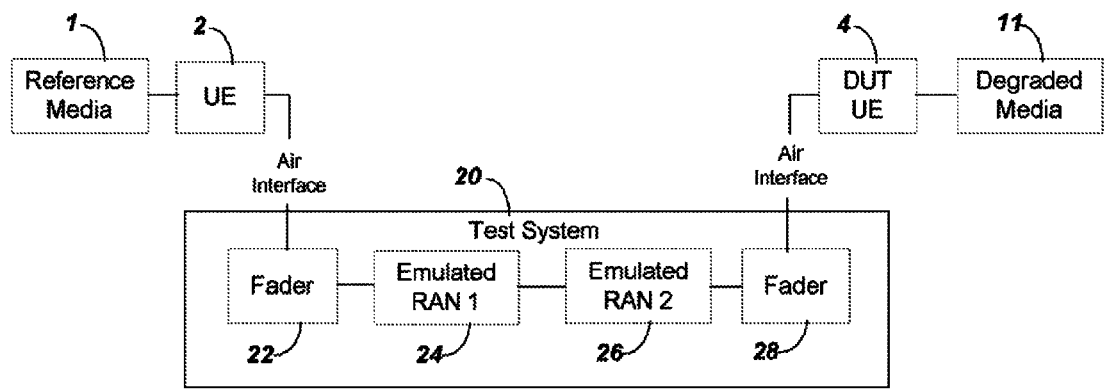
FIG. 2 shows components used in conventional test systems that emulate the effect of delay and jitter to enable evaluation of one or more RANs in a laboratory environment.
Figure 5:
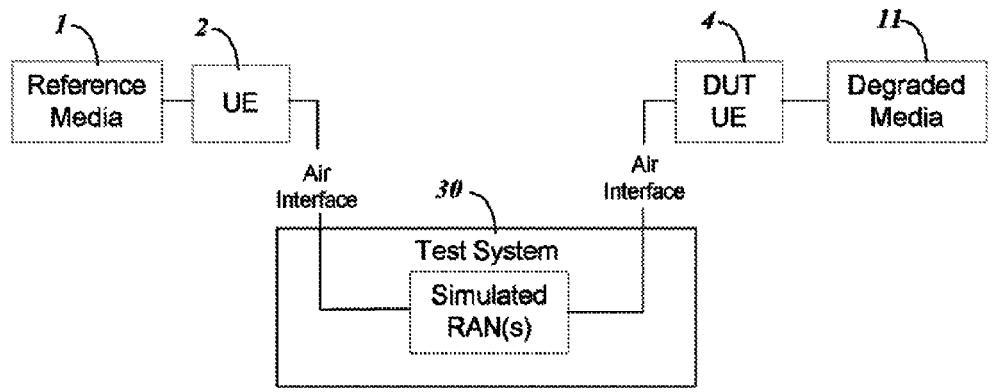
FIG. 5 shows how the test system setup of FIG. 3 can be modified when components according to the present invention are used.

FIG. 5 shows how the test system setup of FIG. 2 can be modified when components according to the present invention are used. The configuration of the simplified test system 30 of FIG. 5 still uses one or more signaling testers that emulate the source and target air interfaces, but it does not need faders. In FIG. 5, the RF link of one or both of the air interfaces can use an ideal configuration that does not add significant losses or jitter. On an ideal RF link, all packets are transmitted with the shortest possible delay and with sufficient RF power to eliminate packet losses. This can be done because all losses and jitter will be simulated instead.

To enable the test system setup of FIG. 5, the impairments in the source RAN and in the target RAN are simulated in the test system software of a server computer. The RAN impairment simulation is controlled by a number of parameters that are representative for the protocol layers of the RAN, such as the maximum number of HARQ transmissions, M_transmit, and the duration of the RLC reordering timer, T_reorder. The source RAN and target RAN may use different parameter values. Such a RAN simulation may be implemented in many different ways and with different levels of detail.

Figure 6:
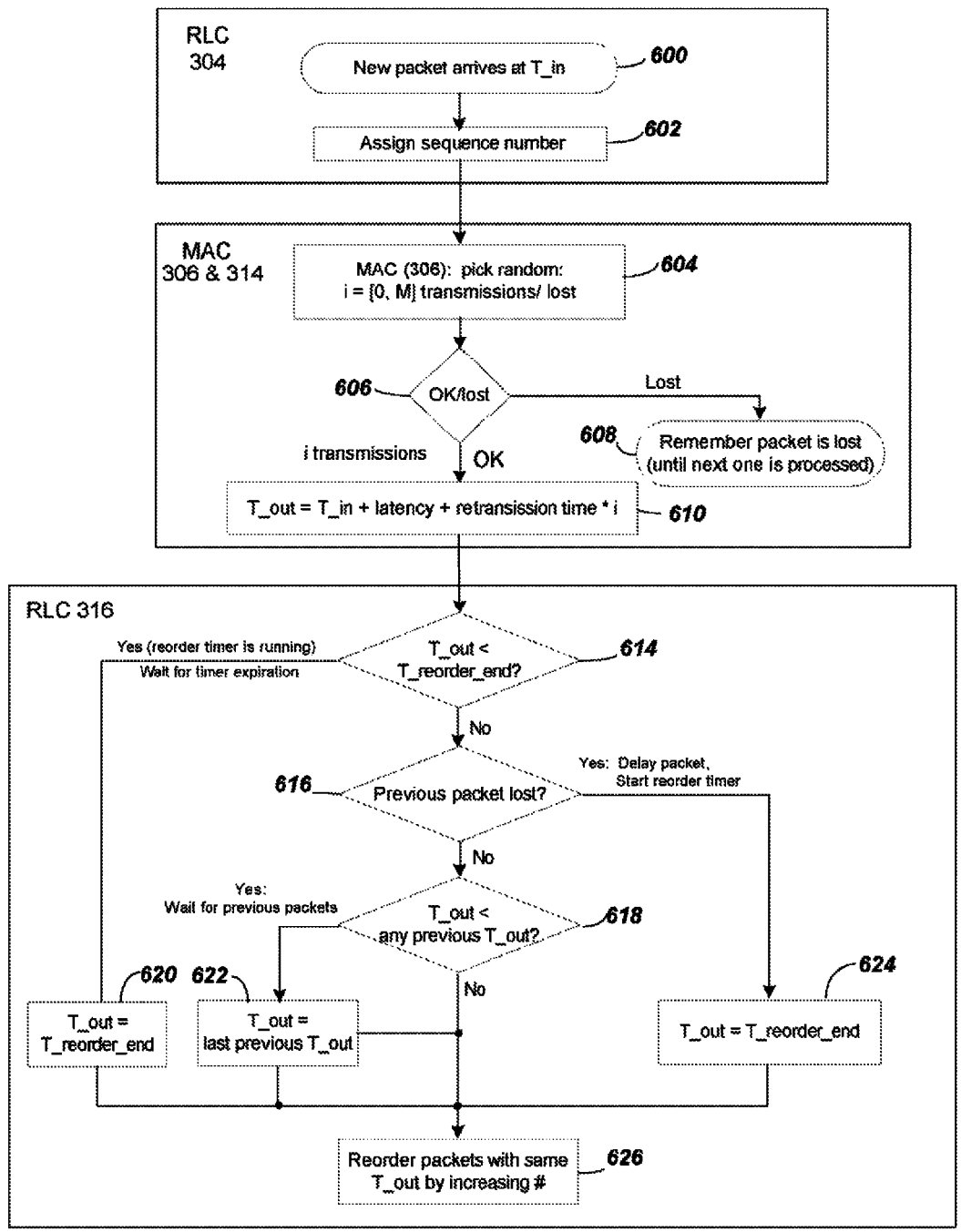
FIG. 6 is a flow chart illustrating an example implementation of a RAN impairment simulation.

An example implementation of RAN impairment simulation is illustrated in the flow chart of FIG. 6. FIG. 6 shows simulation of the Unacknowledged Mode (UM). The simulation is used to delay the real VoIP packets that travel from the source UE to the target UE. The simulation imposes random packet losses (or dropped packets) according to a configured packet loss parameter. For a packet that is not lost or dropped, the simulation will calculate the release time, T_out and the simulation will delay the packet until T_out occurs.

The process begins in step 600 when a VoIP packet is received by the test system in RLC 304 and the packet is tagged with the arrival time T_in. In step 602 the RLC 304 of FIG. 3 assigns a sequence number to the packet. The packets are then passed to MAC 306 and in turn either lost or passed on to MAC 314. In step 604 the MAC 306 determines if the packet will be successfully transmitted or lost. In step 606 the MAC 314 determines if a packet is received OK or lost. If the packet is lost, the MAC 314 in step 608 remembers the packet is lost until the next packet is processed. If the packet is received OK, in step 610 the packet is released at time T_out to the receiver RLC 316. T_out takes into account the latency and retransmission from an initial transmission by adding time to the initial transmission T_in. The actual added delay caused by each of 1 ... M retransmissions along with latency time in LTE amounts to about 2 ms for latency itself plus the retransmission time on the order of 8 ms for each retransmission.

The RLC 316 next begins processing the packets and assuring they are in the correct order in step 614. In the first step 614 in the RLC 316 a determination is made if the packet is received while the reorder timer is running. If so, in step 620 the packet is held for release till the timer expires. If the reorder timer is not running as determined in step 614, the process moves to step 616 to determine if a previous packet is lost. If so, in step 624 timing is delayed for the packet so it can be placed in the correct order. If a previous packet has not been lost as determined in step 616, the process moves to step 618 where it is determined if the packet should be delayed relative to other previous packets. If so, delay is applied in step 622 to ensure packets are properly ordered. If not, in the final step 626 any packets with the same T_out are ordered by increasing sequence number before the packets are passed to the output.

The calculation of the output transmission time T_out in step 610 is controlled by various parameters such as a parameter that specifies which fraction of the packets fails each HARQ transmission (Nack). A typical value of the parameter would be 20% but the simulation can be used with any other value. Note that the simulation algorithm is simpler than the algorithms used by a real MAC and RLC layer. This is because when the fate of a packet is computer-generated, the simulation already knows the fate of all preceding packets.

The calculation of T_out simulates the effect of packet losses, HARQ retransmissions, and reordering and thus precisely replicates the correlations between packet losses and packet delays. More complex simulations incorporate the effects of segmentation (not shown), which may occur in the target RAN when multiple VoIP packets arrive at the same time. In this case multiple VoIP packets may be included in a single MAC PDU which gives rise to additional correlations. The segmentation may also split a large media packet, like a video packet, into smaller segments.

The test system can simulate the impairments in one or more RANs. One way to implement this is to chain two RAN simulations, as shown schematically in FIG. 7, which shows the chaining of a source RAN simulation 720 and a target RAN simulation 730. Here the test system first uses a source RAN simulation 720 to calculate a T_out. However, the test system does not release a packet at the T_out, but instead passes the packet to the target RAN simulation 730. The target RAN simulation 730 may lose the packet or may further delay it, which results in an updated value for T_out.

Figure 7:
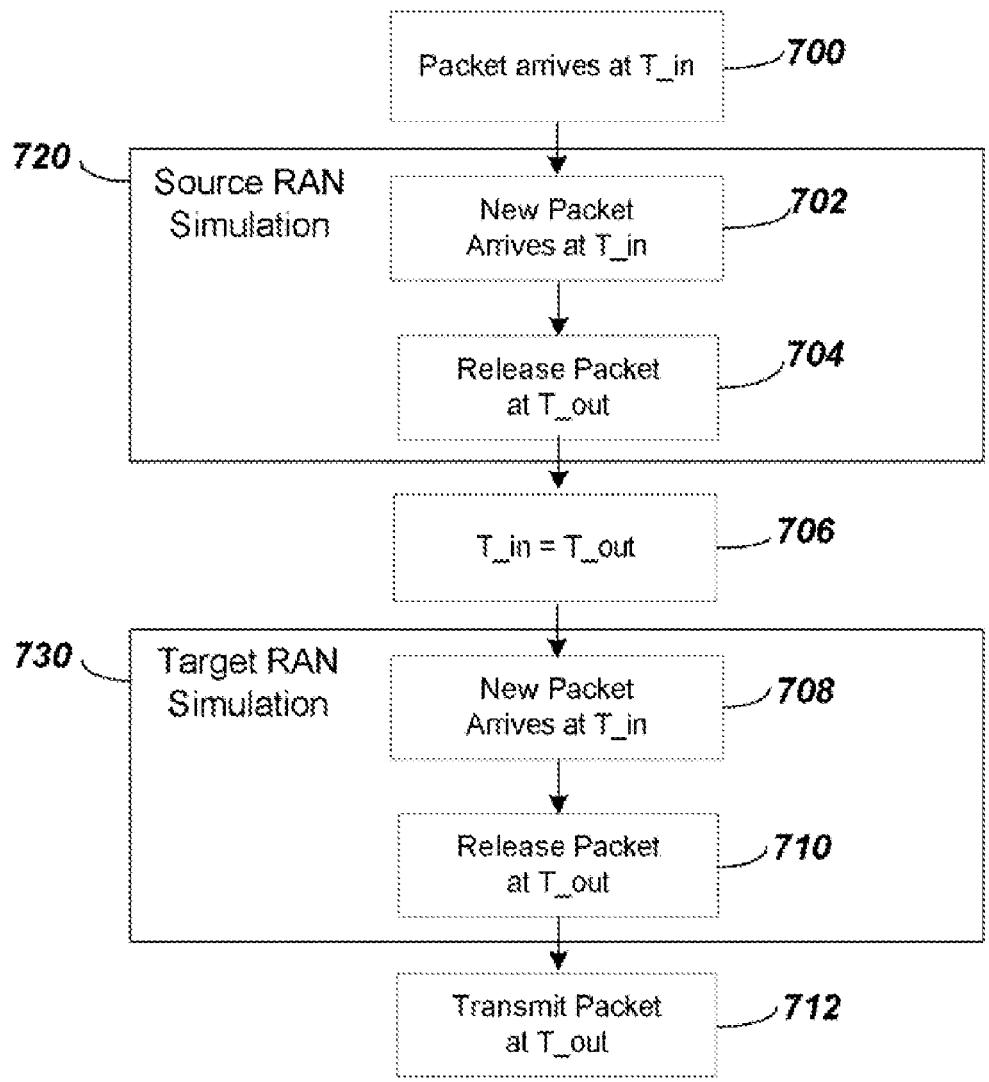
FIG. 7 shows a flow chart illustrating chaining two RAN simulations.

For more details of the steps in FIG. 7, the process begins when a packet arrives at T_in at step 700 and is delivered to the source RAN simulation 720 in step 702. After processing in the source RAN simulation 720, the packet is released in step 704 at a new T_out. The new T_out from the source RAN simulation 720 is set as the new T_in in step 706 and delivered to the target RAN simulation 730 in step 708. The target RAN simulation 730 processes the new packet and may lose or delay the packet before releasing the packet at step 710 for being transmitted at a new T_out in step 712.

Figure 8:
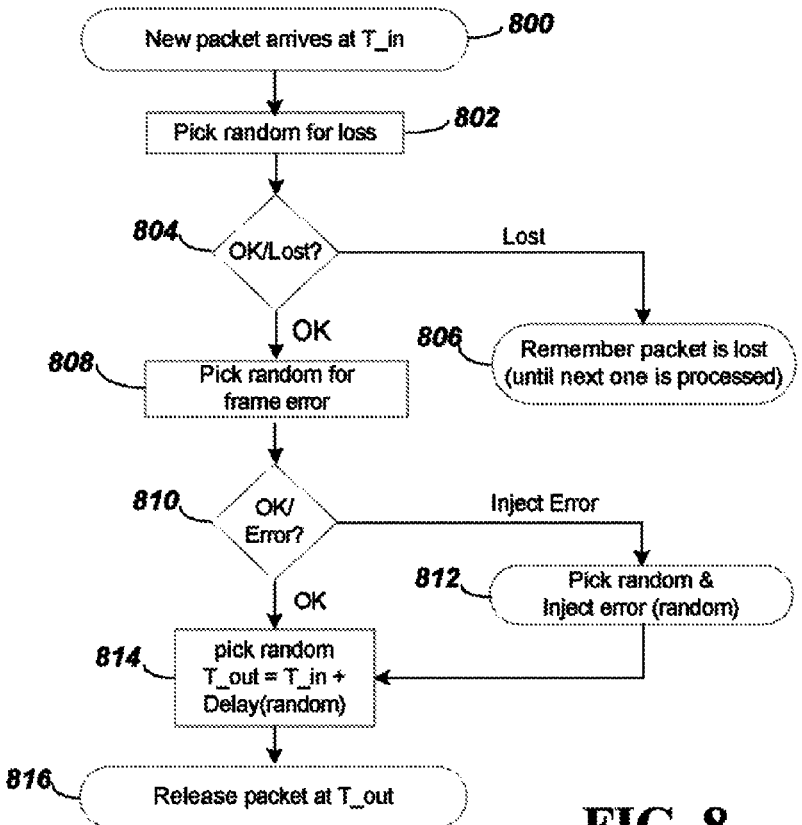
FIG. 8 shows a flow chart illustrating how the test system may also simulate impairments in the network between two RANs.

The test system may also simulate impairments in the network between two RANs as illustrated in FIG. 8. The network simulation can provide parameters to simulate the additional packet losses, packet errors, delay and jitter introduced by the network. The process begins in when a packet arrives in step 800. Random losses or delays are then introduced in step 802. In step 804 a determination is made if a packet has been lost. If so, in step 806 the system remembers the packet is lost until the next packet in sequence is processed. If in step 804 no packet is lost, in step 808 some packets are marked for a random introduction of a frame error. In step 810 a determination is made if the packet is slated for introduction of a frame error. If so, in step 812 the frame error is injected and in step 814 a T_out transmission time is assigned to the packet with some T_out times having a random delay introduced. If in step 810 the packet is not slated for introduction of a frame error, the system proceeds to step 814 for assignment of T_out with some T_outs receiving a random delay. In step 816, the packets are released at their assigned T_out.

Figure 9:
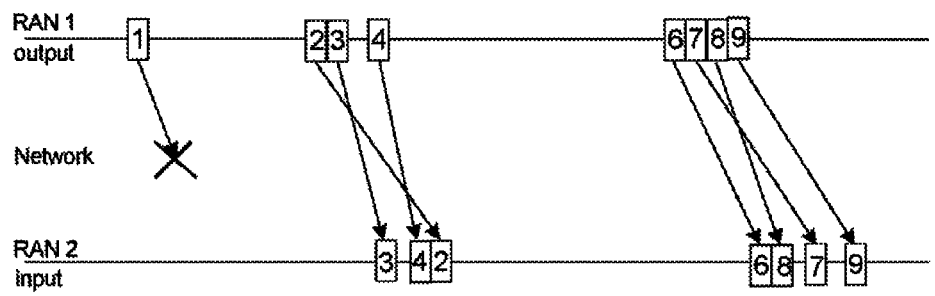
FIG. 9 is a timing diagram illustrating that the network delay simulation may cause voice frames to be delivered out of order.

FIG. 9 is a timing diagram illustrating that the network delay simulation voice frames may be delivered out of order when network jitter is configured to be large compared to the packet spacing. As shown in FIG. 9, the packet #1 is actually lost in the network after being released from RAN 1. Further, packet #2 is delayed in the network so that it is released to RAN 2 after packets #3 and #4. Additionally, packets #7 and #8 are reordered due to delays in the network.

When the source UE and the target UE use different codecs, the network simulation may further provide (real) transcoding. Use of transcoding can introduce further delays. Use of a transcoder typically requires adding a de-jitter buffer, which may be a simulated de-jitter buffer or real one in the test system according to the present invention.

Figure 10:
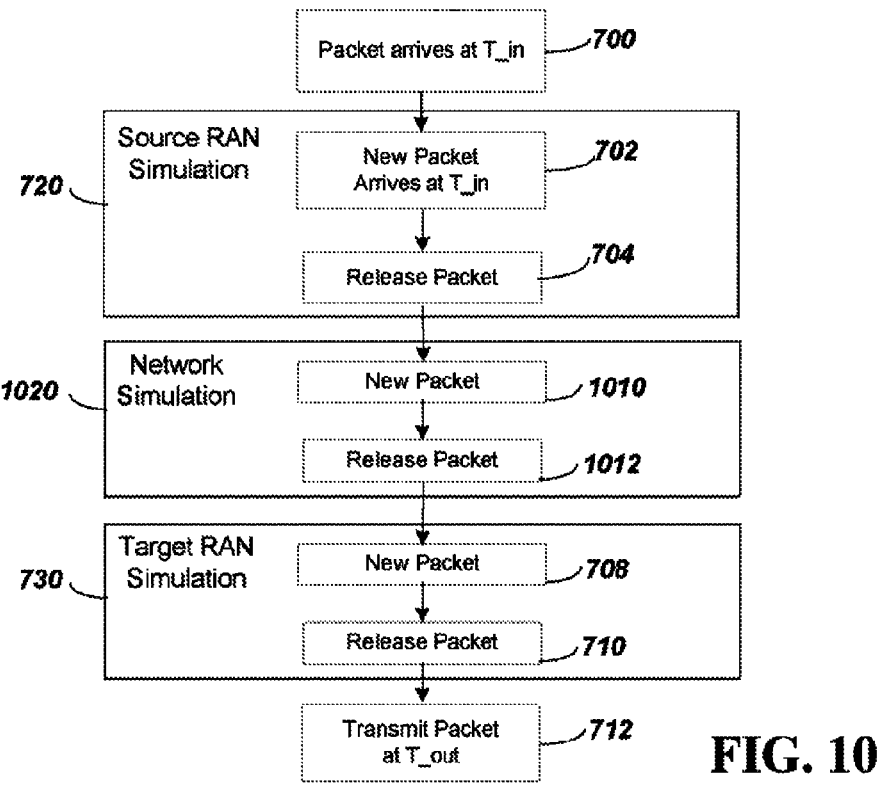
FIG. 10 shows modification of the block diagram of FIG. 7 to add in simulation of a network between source RAN and the target UE.

FIG. 10 shows modification of the block diagram of FIG. 7 to add in simulation of a network simulation 1020 between source RAN simulation 720 and the target RAN simulation 730. In the network simulation 1020 steps 1010 and 1012 are added to account for the network. The source RAN simulation 720 thus releases its packet to the network simulation 1020 as a new packet in step 1010. The network simulation 1020 then simulates impairments of the network and releases the packets in step 1012 to the target RAN simulation 730 for further steps.

Figure 11:
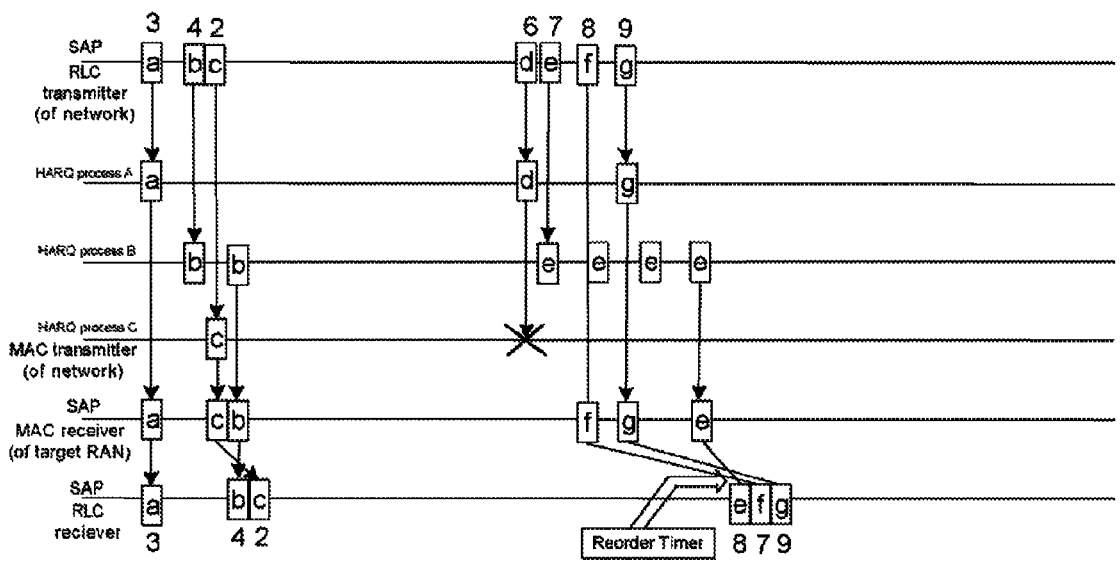
FIG. 11 shows an example simulation where the network has introduced impairments to the packets released from the network simulation of FIG. 9 and the test system passes the packets to the target RAN where further impairments are added by the target RAN.

FIG. 11 shows an example simulation after the network has introduced impairments to the packets released from the network simulation of FIG. 9 and the test system passes the packets to the target RAN simulation 730 where further impairments are added by the target RAN simulation. Note that the RLC layer in the target RAN assigns new sequence numbers to the incoming packets (a, b, c, d, e, f, g). The RLC receiver 316 of the network will deliver the packets with increasing new sequence numbers. Thus, if a target RAN receives packets from the network out of the original order (3, 4, 2, 6, 8, 7, 9), the packets will remain out of order as shown.

Because of the HARQ retransmissions and RLC reordering, there is a strong correlation between the impairments of consecutive packets. For example, if a packet is delayed significantly, the next packet will be late as well (e.g. packets e and f relative to packet c in FIG. 11) and if a packet is lost, the next packet will be delayed (e.g. packets d and e). FIG. 11 also shows that packets tend to become bunched together. It is important to simulate the details of this bunching, because bunching seriously impacts voice quality, particularly when a large bunch of packets is lost in a de-jitter buffer. Prior art tools do not simulate correlations between the impairments of consecutive packets, and do not reveal the effect of bunching on voice quality.

FIG. 11 illustrates that operation of the target RAN is otherwise similar to the source RAN illustrated in FIG. 4. The MAC transmitter 306 has multiple HARQ processes. The packet b takes one retransmission in process B before arriving. The RLC receiver 316 then must reorder packets b and c. Packet e requires three retransmissions before arriving. Packets e, f and g must then be reordered by the RLC receiver using the reorder timer.

Single UE Test System Operation

Figure 12:
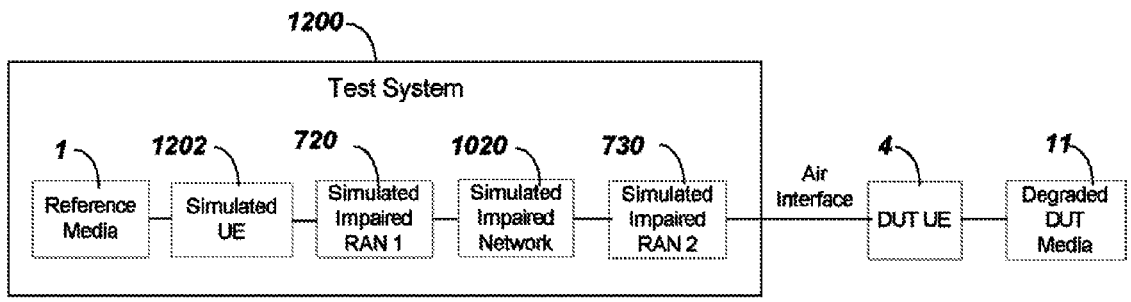
FIG. 12 illustrates how the test system can chain a source RAN simulation with a network simulation and a target RAN simulation.

FIG. 12 illustrates how the test system can chain a source RAN simulation 720 with a network simulation 1020 and a target RAN simulation 730 while using only one real DUT UE 4. The test system 1200, which can be included in a single server computer, can include software to generate the entire simulation chain and the source UE 1202. The system can store recorded or computer-generated reference media 1 and simulate a UE 1202, the first simulated RAN 720, the connecting network 1020 and the second simulated RAN 730. The target RAN simulation 730 may or may not use the same protocol rules as the source RAN simulation 720 illustrated in FIG. 6, and it may use different values for RAN parameters like T_reorder. To accomplish the chaining, the T_out of the first RAN simulation 720 is used as T_in for the network simulation 1020, and the T_out of the network simulation 1020 is used as the T_in of the second RAN simulation 730. Packets that are not lost in the simulations are released at the T_out over the air interface after the second RAN simulation 730 by a signaling tester (not shown). The signaling tester can be a simple one that emulates an ideal air interface that does not introduce further impairments or fading.

To estimate a MOS in this setup, the test system is configured to provide the ideal air interface and the source RAN simulation 720, the network simulation 1020 and the target RAN simulation 730 are configured to produce artificial impairments. To begin the testing process a call is started between the simulated source UE 1202 and the target DUT UE 4 and sound is played from a reference file into the codec of the simulated source UE 1202. The sound may be represented by digital data, such as PCM. The codec runs in encoder mode to produce VoIP packets that are presented to the source RAN simulation 720 which is chained to the target RAN simulation 730. These simulations delay the VoIP packets before they are transmitted over the air interface to the real DUT UE 4. The DUT UE 4 uses the codec in decoder mode to obtain first a digital representation of the sound, such as PCM. The DUT UE 4 may then use a digital-to-analog converter (DAC) to produce analog sound. The resulting sound that represents the stream of packets is captured at the Audio/Video port of the Server PC 1500, digitized, and stored as a degraded media file 11. PESQ or POLQA or a similar procedure can finally be used to compare and analyze the reference and degraded files to obtain the MOS.

There are alternative ways to produce the degraded file 11 for evaluation. In one alternative, the digital result of the UE 4's decoder is a stream of packets that is captured by the UE 4 in an internal degraded file. That degraded file can later be captured from the UE 4 by the server PC 1500, for example over the air interface or over the UE 4's Universal Serial Bus (USB) interface. In another alternative, the decoder's digital output is streamed out of an interface of the UE 4 (e.g. USB) and captured externally on another computer or on a memory stick as the degraded file 11. A disadvantage of these alternatives is that the sound path does not include the analog audio components in the UE 4.

The MOS determined with the system of FIG. 12 reflects the total degradation of the entire path from the reference file 1 delivered to the source UE 1202 to the audio output of the target UE 4. Presumably the MOS is dominated by the artificial impairments introduced in test system 1200. One can determine the contribution to the degradation of the target UE 4, by making a copy of the voice packets before they are sent over the air interface as shown in FIG. 13.

Figure 13:
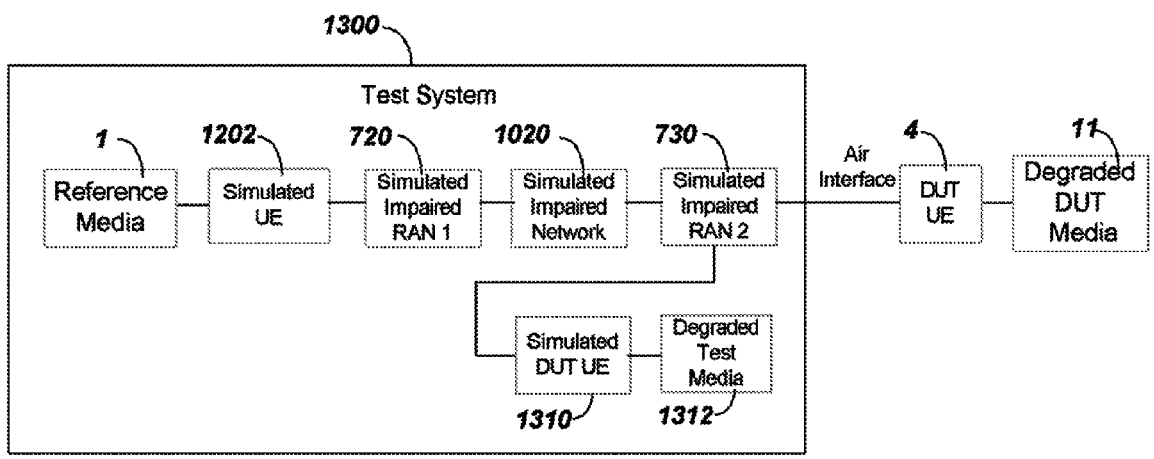
FIG. 13 shows modifications to FIG. 12 to produce a simulated degraded test media to enable analysis of effects introduced by the target DUT.

FIG. 13 modifies FIG. 12 to add a computer generated simulated DUT 1310 from the output of the target RAN 730 to produce a simulated degraded test media 1312 to form new test system 1300. The output of target RAN 730 is still also passed over an air interface to a real target UE DUT 4. The voice packets are then processed by both the second simulated UE 1310 and the real DUT 4. The second simulated UE 1310 provides a de-jitter buffer and a codec to decode the impaired voice packet. The impaired packets are presented to the second simulated UE 1310 at their respective simulated T_out times and the output of the decoder is captured in a file which is called the degraded test media file or intermediate media file 1312. To determine the contribution of the UE, one uses PESQ or POLAQ or the like to compare and analyze the intermediate file with the degraded file captured at the target UE. This way one can determine, for example, how deep the de-jitter buffer is in the UE 4.

The components shown in FIG. 13 enable an alternative embodiment of the present invention. This embodiment estimates a MOS for a combination of impairments of two target DUTs 4 and 1310. The system enables optionally determining impairments of the simulated connecting network 1020 both with the impairments of the real DUT 4 and without target DUT 730 impairments in DUT 1310 to enable identification of the effect of impairments introduced by the DUT UE 4 by comparing the degraded media 11 with degraded media 1312, for example by the use of PEQ or POLQA.

Non-real Time Operation

The RAN simulation algorithm illustrated in FIGS. 4 and 11 are such that packets are presented to the simulation in order of increasing T_in. Thus, when the network simulation changes the packet order, the packets should be sorted or reordered by increasing T_in before they are passed to the next RAN simulation. Otherwise, as illustrated in FIG. 11, the packets, like 2, 3 and 4, remain reordered as 3, 4 and 2.

The need to reorder packets increases the complexity of the simulation, because new packets continue to enter into the simulation while the reordering is taking place. These new packets may impact the final packet order, and require functionally that is akin to a de-jitter buffer. The complexity of the reordering can be reduced by running the simulation in non-real time. In this non-real time mode, sorting or reordering can be provided at each air interface simulation that would otherwise introduce a non-real time component.

Figure 14:
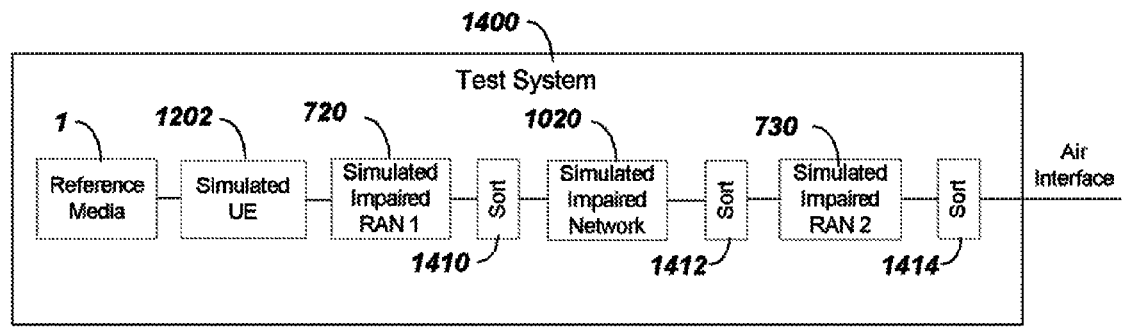
FIG. 14 shows the software components of the revised test system to enable the simulation of RAN and/or network impairments in a non-real time.

The software components of the revised test system 1400 to enable the sorting in a non-real time simulation are illustrated in FIG. 14. Sorting steps 1410, 1412 and 1414 are introduced in test system 1400 after each of the source RAN simulation 1206, network simulation 1208, and target RAN simulation 1210. If a simulation step changes the order of the frames, the packets are sorted in a sorting step after the simulation step is finished. The packets are sorted by increasing T_out. The result of this cascade of simulations and sorts is then captured or stored in a memory like a random access memory or a hard drive as an impaired media file before it would be sent over the air interface. For each packet, the simulated T_out is recorded as well. To complete the MOS estimation, the test system 1400 plays out the stored impaired media in real time by transmitting each stored packet in real time at the T_out resulting from the cascaded simulation via the signaling tester over the air interface with the DUT UE 4. Note that in this case T_out is referenced with respect to the beginning of the real-time play-out.

The non-real time preparation does not only simplify the reordering of out-of-order packets. It also reduces the computational load on the test system while the packets are being transmitted to the DUT. The computational load can be reduced for MOS evaluation of uplink media by capturing all uplink packets in an intermediate file and by ordering and converting the packets after all packets corresponding to the reference file have been transmitted over the air interface. The stream of packets is thus produced in non-real time, stored and played out later in real time.

Proposed Implementation

Figure 15:
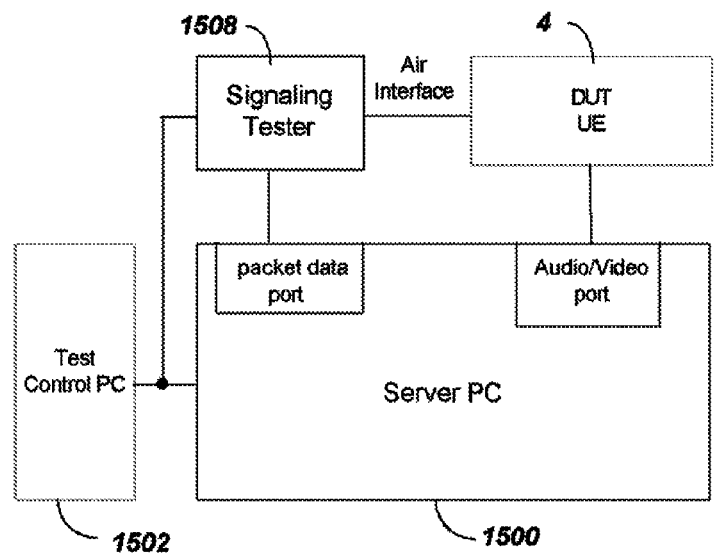
FIG. 15 shows a block diagram of components making up a test system according to the present invention.

FIG. 15 shows a block diagram of components making up a test system according to the present invention. The components used in the test system are included in the ME7834 Test Platform available from Anritsu Company, but does not include faders. The platform includes a server PC 1500 with a user interface, a test control PC 1502, a signaling tester 1508, and a DUT UE 4. The signaling tester 1508 can include the MD8480, MD8470 and MD8340 test devices available from Anritsu Company. These signaling testers function similar to a base station in a mobile telephone system, and in particular the MD8340 emulates an LTE system base station. The server PC 1500 includes a sound card that can connect to a speaker and microphone or to the UE DUT 4 headset/microphone jack with audio and video ports to enable testing with a DUT UE 4. The server PC 1500 also includes a packet data signal port for testing IP Multimedia Subsystem (IMS) functionality that provides SIP messaging, voice, video and other data signal capabilities over LTE. Finally, the server PC 1500 includes software for media quality evaluation and for estimation of a MOS. The test control PC 1502 and the server PC 1500 may be implemented on a single computer.

The test system shown in FIG. 15 typically provides for testing of basic functionality over LTE. The system emulates an air interface that is essentially lossless and has a fixed latency and does not use or apply faders. The implementation according to the present invention extends the implementation of the existing test system product. The present invention extends the system by modifying the software in the server PC 1500 to implement the test simulation process described herein.

Figure 16:
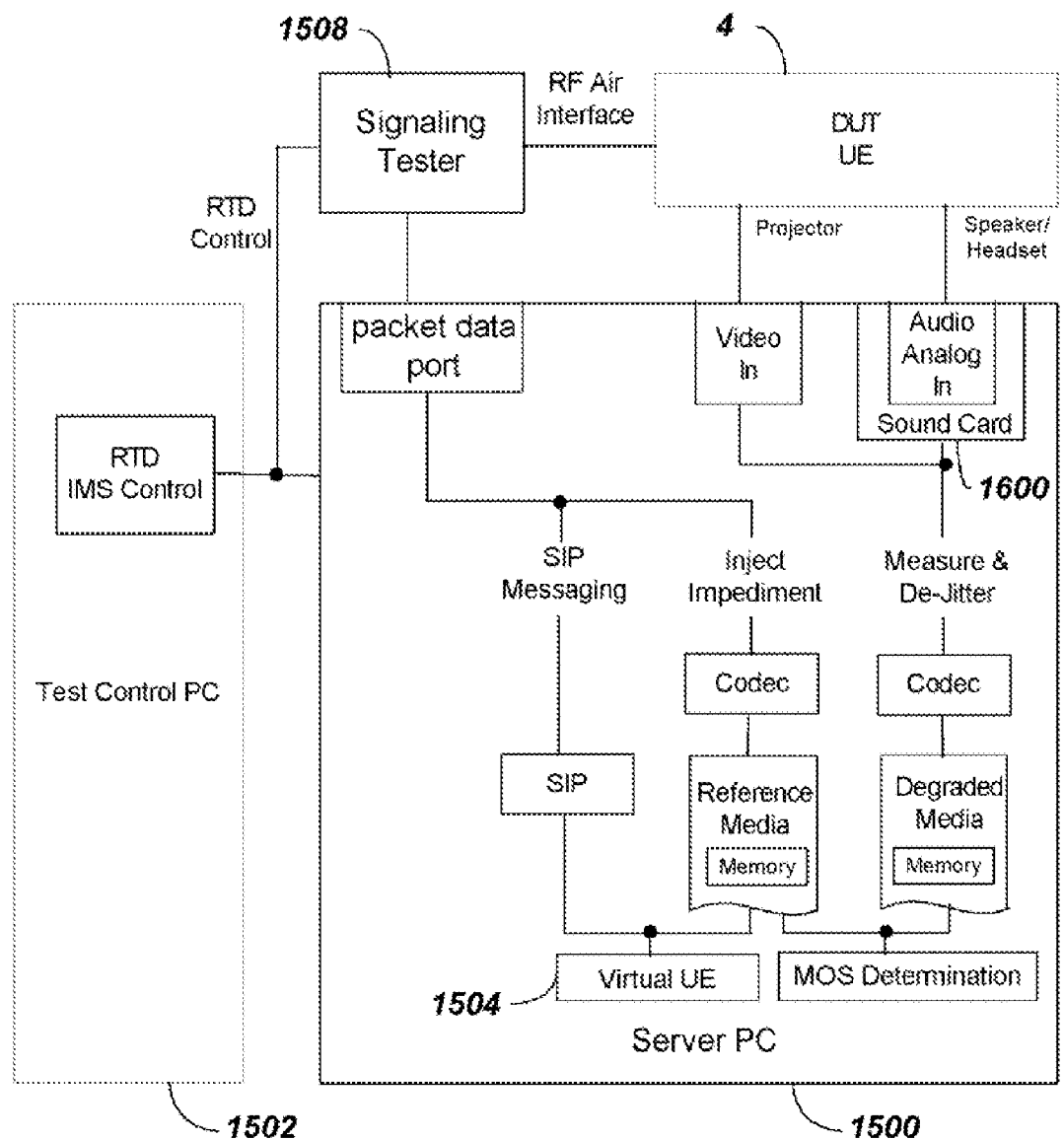
FIG. 16 provides more details of the block diagram of FIG. 15 showing components used in a downstream communication path.

FIG. 16 provides more details of the block diagram of FIG. 15 showing components used in a downstream communication path. FIG. 16 also shows details of the control PC 1502. The functionality of the IMS is distributed between the control PC 1502 and the server PC 1500. The main task of the IMS is to set up a call between a simulated or "virtual" source UE provided by from the server PC 1500 and the DUT UE 4. The server PC 1500 simulates a media gateway and handles all voice, messaging and broadband media data as coordinated by the control PC 1502. The server PC 1500 further simulates a "virtual" source UE 1504 that communicates VoIP with the target UE DUT 4 through signaling tester 1508.

For downlink VoIP, the server PC 1500 provides a reference media signal, for example by reading an audio file or a video file from a Compact Disc (CD) of from a hard drive. The server PC 1500 converts the digital media signal from the reference media file with a codec; encapsulates the resulting voice frames into Real Time Transport Protocol (RTP) and sends the RTP packets as a stream of packets through a packet data output port to the test port of the signaling tester system 1508. The reference media file created is also stored in a memory as a reference digital media file for later analysis. The signaling tester 1508 applies Robust Header Compression (RoHC) for LTE signal transmission and schedules the packets for transmission over the downlink RF air interface. The DUT UE 4 receives the packets; applies RoHC decompression; decapsulates the resulting RTP packets and decodes the resulting voice frames with the appropriate codec to obtain audio. The DUT UE 4 outputs an audio representation of the stream of packets via its speaker or via a headset jack back to server PC 1500.

The server PC 1500 can use a sound card 1600 to handle the analog audio of the DUT UE 4. The sound card 1600 receives analog audio from the DUT UE 4 and applies it to a codec that converts the audio back to a digital media signal (PCM). Although a sound card is shown, other components known in the art can be used to transmit audio such as a direct cable connection through an earphone audio jack or other wireless connection that allows the audio signal to be transmitted such as through a speaker and microphone system or over Bluetooth between the DUT UE 4 and server computer 1500. In subsequently described embodiments, a video signal can similarly be transmitted directly between the server PC 1500 and DUT UE 4, effectively providing a digital "media" signal connection possibility. The digital media signal can be transmitted in both an uplink direction and a downlink direction as described subsequently. The digital media signal in the downlink direction transmitted in audio form from the DUT UE 4 to the server PC 1500 is then stored in a file called the "degraded media file" that will be compared with a "reference media file" created by the "virtual UE" and stored in memory in the server PC 1500 for determination of audio quality using MOS.

The server PC 1500 simulates the RAN and network impairments under control of Rapid Test Designer (RTD) software provided in the test control PC 1502. The RTD software of the test control PC 1502 can specify to the server PC 1500 the impairment values that are to be applied. To simulate impairments, the server PC 1500 first generates downlink media packets (which are also stored in a memory in the PC 1500 as a reference audio file) and then encodes them using a codec to provide a source audio file at the precise specified rate. The server PC 1500 then applies the specified impairments by removing a fraction of the packets according to the frame loss rate; introducing voice frame errors in some of the remaining packets according to the frame error rate; and by delaying the remaining packets according to the specified parameters. The data is transmitted through the packet data port as a stream of packets from the server PC 1500 to signaling tester 1508.

The DUT UE 4 captures the stream of packets from the signaling tester 1508. The DUT 4 then in the downstream direction creates a media signal from the stream of packets. The media signal created from or derived from the stream of packets by the DUT is then provided to the server PC 1500, for example by playing an audio file through a speaker to be received by a sound card 1600 of the server PC 1500. The server PC 1500 captures the media file and obtains a MOS by using POLQA or similar evaluation technique know in the art to compare the contents of the source file (the "reference media file") with the file captured from its sound card 1600 as received from the DUT UE 4 (the "degraded media file"). POLQA also estimates the delay between the audio in the reference file and the degraded file.

More details of operation of components of the system of FIG. 16, particularly involving the test control PC 1502, are as follows. First, more details of the test control PC 1502 are that it includes a RTD system to control the IMS test signal generation and transmission components, the systems being controlled including the server PC 1600, the signaling tester 1508 and the DUT UE 4. The RTD instructs the server PC 1500 which reference file is to be used as audio source. The RTD also provides parameters that specify how the downlink VoIP is to be impaired in the server PC 1500. After the DUT UE 4 attaches to LTE and registers with the IMS of the test platform 1508, the RTD initiates the call by instructing the server PC 1500 to let the virtual UE send a SIP INVITE to the DUT UE 4. The RTD then controls the remainder of the call setup.

Once call setup is complete, the more details of the audio path that is initiated are as follows. First, after setup completion is acknowledged, the server PC 1500 starts the playout of the reference audio file from its internal virtual UE into the codec. The server PC 1500 then encapsulates the voice frames from the codec in an RTP stream of packets and applies the specified impairments before sending the RTP packets to the DUT UE 4 via the signaling tester 1508. The analog audio output of the DUT UE 4 is equivalent to the stream of packets and is applied to the sound card 1600. The server PC 1500 then captures the resulting degraded audio and produces the degraded audio file. The server PC 1500 then informs the RTD in the test control PC 1502. The RTD ends the call by instructing the server PC 1500 to send a SIP BYE message. The RTD also instructs the server PC 1500 to perform a voice quality comparison by running POLQA on the audio files to estimate a MOS and the measurement results are passed to the RTD. For improved statistics, the test system may repeat the above procedure using the same reference media signal, or may repeat it using different reference files. Optionally, several files can be processed during a single call.

In one embodiment of the present invention, the simulated impaired packet stream is saved in memory as a first reference media file. A copy of the first reference media file is then provided through an internal de-jitter buffer that simulates an ideal DUT UE, such as the component 1310 in FIG. 13. The simulated DUT UE RTP output is then decapsulated and the resulting voice frames are decoded to produce a second degraded media file. The server PC 1500 can run the POLQA to compare and analyze the first and the second degraded files to estimate the contribution to the quality degradation that comes from the DUT UE 4.

In another optional embodiment of the present invention, the server PC 1500 can be configured to test the DUT UE under high loading conditions. To create high loading conditions the server PC 1500 can send additional packets to the target UE 4. The server PC can also create high loading conditions by sending control signals to force the target UE 4 to send uplink packets while the MOS test is in progress. This allows for evaluation of the MOS under high load conditions.

Although audio signals are primarily described in the test process for the media signals being tested above, video signals or a combined video-audio signal can likewise be tested in the downlink direction using the system illustrated in FIG. 16. For testing of video signals, the server PC 1500 creates a stream of video packets from a reference video signal, applies impairments and sends the signals over the RF air interface via signaling tester 1508. The DUT 4 de-jitters and decodes the stream of packets and plays the video images that are the equivalent to the stream of packets on a screen. The screen typically is the display screen of the DUT. The server PC 1500 then uses a camera to capture the analog video images created from or derived from the stream of packets by the DUT 4 and converts them to digital data to apply to a video in port, possibly using a video capture card. The received camera data is then used to provide the degraded media signal. Alternatively, the server PC 1500 may capture the degraded media by obtaining the degraded media signal in digital form directly from the DUT, for example via a USB connection.

Figure 17:
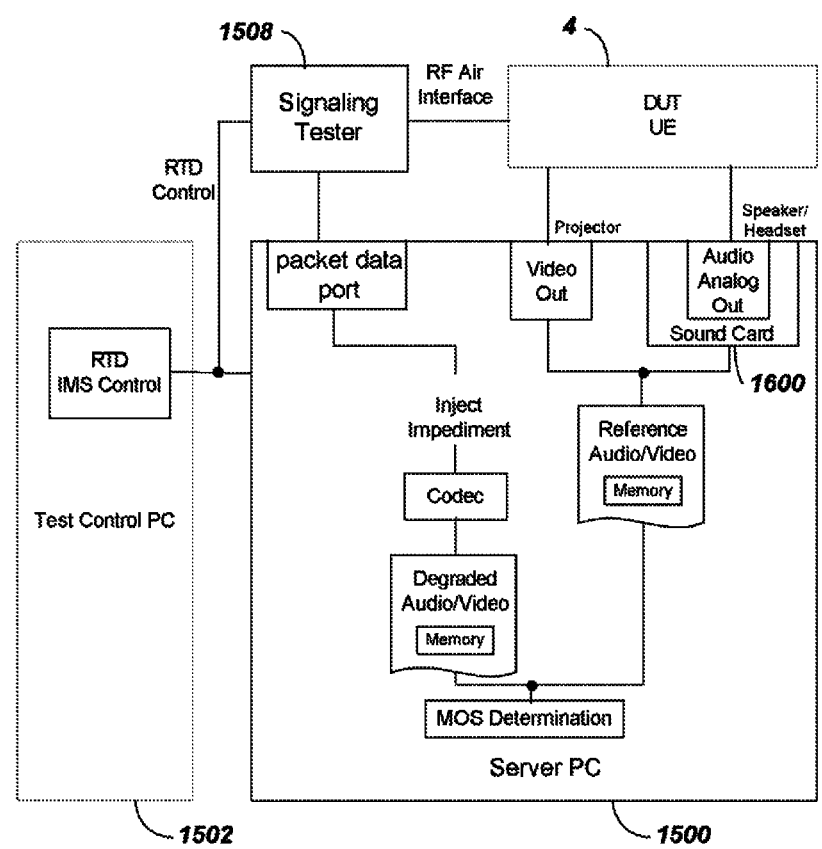
FIG. 17 provides more details of the block diagram of FIG. 16 showing components used in an upstream communication path.

In another embodiment, the present invention can be configured to evaluate the MOS for voice communications in the reverse, uplink direction. FIG. 17 provides more details of the block diagram of FIG. 16 showing components used in an upstream communication path. To accomplish upstream communication, the server PC 1500 obtains or creates a reference audio file and stores it as the reference media audio/video file in memory. Instead of converting the reference file to packets and transmitting it to the signaling tester 1508, the server PC 1500 instead for the uplink media signal converts the audio reference file into an analog audio signal that is the equivalent of the stream of packets using the sound card, which in turn injects the sound via a speaker or headset connector cable to the DUT UE 4. The DUT UE 4 will convert the audio to a packet stream and transmit the stream over the RF air link via the signaling tester 1508 back to the server PC 1500. The server PC 1500 will capture the stream of packets and can then impose artificial impairments to simulate effects of the one or two RANs as well as the interconnecting network, decode the packet stream and store the resulting degraded media signal in memory as a degraded file for MOS estimation. Alternatively, the server PC 1500 may inject the reference media signal in digital form directly into the DUT UE 4, for example via a USB connection. The server PC 1500 may, for example, inject the reference audio signal in PCM format. The DUT UE 4 will then convert the injected audio to an RTP packet stream and transmit the stream over the RF air link.

In another embodiment, instead of audio in the reverse uplink direction, a video signal can be tested in the uplink direction. To accomplish this, an analog video signal image is displayed on a screen (not shown) by a projector of the server PC 1500. The screen may also be a monitor screen attached to server PC 1500. The DUT UE 4 then uses a video camera to record the video signal. The recorded video signal is converted to a packet signal by the DUT UE 4 and transmitted through the signaling tester 1508 back to the server PC as a RTP stream of packets. The server PC 1500 then captures the stream of packets and compares the degraded video signal received with the reference video signal it projected to the DUT UE 4 to analyze the media quality degradation. Alternatively, the server PC 1500 may inject the reference video signal in digital form directly into the DUT, for example via a USB connection.

In a further embodiment, both audio and video can be transmitted in the uplink direction as a combined analog media signal. Both the audio and video can then be recorded by the DUT UE 4 and transmitted in packet form back to the server PC 1500 for evaluation. The audio signal can be evaluated by MOS, while the video can be evaluated by a similar procedure known in the art to compare the reference video and degraded video signal to analyze the video signal degradation.

Although the present invention has been described above with particularity, this was merely to teach one of ordinary skill in the art how to make and use the invention. Many additional modifications will fall within the scope of the invention, as that scope is defined by the following claims.

What is claimed:

1. A method to estimate media quality degradation resulting from wireless transmission to a device under test (DUT) to thereby characterize performance of the DUT, the method comprising:
    encoding a reference media signal into a stream of packets;
    imposing first simulated impairments to individual packets in the stream of packets to simulate degradation that could result from a first wireless transmission of the stream of packets over an interface with a peer media device;
    wherein the first simulated impairments simulate degradation resulting from wireless transmission over a first radio access network (RAN);
    transmitting the stream of packets over a radio frequency (RF) link;
    receiving the stream of packets at the DUT;
    capturing a degraded media signal derived from the stream of packets via the DUT;
    analyzing the degraded media signal to estimate the media quality degradation and
    characterizing the performance of the DUT by repeating the steps of encoding, imposing, transmitting, receiving, capturing and analyzing for a plurality of different simulated impairments.

2. The method of claim 1, further comprising:
    imposing second simulated impairments to individual packets in the stream of packets to simulate degradation that could result from a second wireless transmission of the stream of packets.

3. The method of claim 2, wherein the second wireless transmission is a transmission over a second RAN.

4. The method of claim 3, further comprising:
    imposing simulated network impairments to individual packets in the stream of packets to simulate degradation that could result from a transmission over a fixed network connecting the first RAN and the second RAN.

5. The method of claim 4, wherein at least one of the first simulated impairments, the second simulated impairments, and the simulated network impairments change the order of at least two individual packets in the stream of packets.

6. The method of claim 2, wherein at least one of the first simulated impairments and the second simulated impairments comprises a simulated dropping of a first individual packet that causes a delay in the transmitting of a second individual packet.

7. The method of claim 2, wherein at least one of the encoding the reference digital media signal into a stream of packets, imposing first simulated impairments to individual packets in the stream of packets, and imposing second simulated impairments to individual packets in the stream of packets comprises storing the stream of packets in a memory, prior to the transmitting the stream of packets over the RF link, and wherein the transmitting the stream of packets over the RF link comprises transmitting the stream of packets over the RF link in real time.

8. The method of claim 1, wherein the step of analyzing the degraded media signal comprises comparing the degraded media signal to the reference media signal.

9. The method of claim 1, wherein the step of analyzing comprises determining a mean opinion score (MOS) to quantify the amount of media quality degradation.

10. The method of claim 9, wherein a perceptual objective listening quality assessment is used to determine the MOS.

11. The method of claim 1, wherein the link operates under ideal RF conditions.

12. The method of claim 1, wherein the encoding the reference media signal into a stream of packets comprises:
    converting the reference media signal from a digital representation to obtain an analog media signal; and
    injecting the analog media signal into a device under test (DUT).

13. The method of claim 12,
    wherein the reference media signal comprises a reference voice signal,
    wherein the converting the reference digital media signal to obtain an analog media signal comprises converting the reference voice signal to obtain an analog voice signal, and
    wherein the injecting the analog media signal into the DUT comprises injecting the analog voice signal into a microphone connector.

14. The method of claim 12,
    wherein the reference media signal comprises a reference video signal,
    wherein the converting the reference media signal to obtain an analog media signal comprises converting the reference video signal to obtain video images, and
    wherein the injecting the analog media signal into the DUT comprises capturing video images with a camera in the DUT.

15. The method of claim 12,
    wherein the reference media signal comprises a reference voice signal and a reference video signal.

16. The method of claim 1, wherein the step of capturing a degraded media signal comprises:
    converting the stream of packets to obtain an analog media signal; and
    capturing the analog media signal from a device under test.

17. The method of claim 16,
    wherein the analog media signal comprises an analog video signal, and
    wherein the capturing the analog media signal from the DUT comprises capturing images from a screen on the DUT.

18. An apparatus comprising:
    a server computer for providing a reference media signal, for encoding the reference media signal into a stream of packets, and for providing first impairments to packets in the stream of packets to simulate degradation that could result from a first wireless transmission of the stream of packets to create an impaired packet output signal at an output;
    wherein the first impairments simulate degradation resulting from wireless transmission over a first radio access network (RAN);
    a signaling tester coupled to the server computer for receiving the impaired packet output signal from the output of the server computer and transmitting the impaired output signal over a radio frequency (RF) link to a device under test (DUT);
    wherein the server computer is further configured for receiving a media output signal from the DUT created from the impaired packet output signal, converting the media output signal to provide a degraded media signal;
    wherein the server computer is further configured for analyzing the degraded media signal to provide an estimated amount of degradation in media quality; and wherein the server computer is further configured for characterizing the performance of the DUT by obtaining degraded media signals for a plurality of different impairments.

19. The apparatus of claim 18, wherein the server computer further provides second impairments to packets in the stream to simulate degradation that could result from a second wireless transmission through a second RAN to create the impaired packet output signal.

20. The apparatus of claim 18, wherein the first impairments comprise a simulated dropping of a first individual packet that causes a delay at the output of a second individual packet.

21. The apparatus of claim 18,
wherein the converting the media output signal to provide a degraded media signal comprises capturing an analog media signal from a DUT, and
wherein the capturing the analog media signal from the DUT comprises capturing an analog voice signal from at least one of a speaker in the DUT and a headset connector on the DUT.

22. The apparatus of claim 18,
wherein the reference media signal comprises a video signal, and
wherein the receiving the impaired packet output signal from the DUT comprises capturing images from a screen on the DUT.

23. The apparatus of claim 18,
wherein at least one of the encoding the reference digital media signal into a stream of packets and imposing first impairments to a stream of packets comprises storing the stream of packets in a memory, prior to the transmitting the impaired packet output signal over the RF link, and
wherein the transmitting the stream of packets over the RF link comprises transmitting the stream of packets over the RF link in real time.

24. An apparatus comprising:
a server computer for providing a reference media signal to a device under test (DUT), for obtaining a stream of packets at an input, for providing first impairments to packets in the stream to simulate degradation that could result from a first wireless transmission of the stream to create an impaired stream of packets, and for capturing the impaired stream of packets to provide a degraded media signal;
wherein the first impairments simulate degradation resulting from wireless transmission over a first radio access network (RAN);
a signaling tester coupled to the server computer for receiving the stream of packets from the DUT over a radio frequency (RF) link, and for transmitting the stream of packets to the input of the server computer; and
wherein the server computer is further configured for analyzing the degraded media signal to provide an estimated amount of degradation in media quality; and
wherein the server computer is further configured for characterizing the performance of the DUT by obtaining degraded media signals for a plurality of different impairments.

25. The apparatus of claim 24, wherein the server computer includes a de jitter buffer and wherein the capturing the impaired stream of packets to provide a degraded media signal comprises passing the impaired stream of packets through the de-jitter buffer.

26. The apparatus of claim 24,
wherein the reference media signal comprises a reference voice signal,
wherein the providing the reference media signal to the DUT comprises converting the reference voice signal from a digital representation to obtain an analog voice signal and injecting the analog voice signal into a microphone connector of the DUT.

27. The apparatus of claim 24,
wherein the reference media signal comprises a reference video signal,
wherein the providing the reference media to the DUT comprises outputting the reference video signal on a screen.

* * * * *